United States Patent
Radke

[11] 3,901,530
[45] Aug. 26, 1975

[54] MULTIPLE MINI HYBRID WITH DIRECT BAG CONNECTION

[75] Inventor: Donald G. Radke, Rochester, Mich.

[73] Assignee: Allied Chemical Corporation, New York, N.Y.

[22] Filed: Aug. 8, 1973

[21] Appl. No.: 386,806

[52] U.S. Cl. .................. 280/150 AB; 102/70.2 R
[51] Int. Cl. ........................................ B60r 21/10
[58] Field of Search .......... 280/150 AB; 222/3, 5; 102/70.2 R; 141/4; 137/68

[56] References Cited
UNITED STATES PATENTS

| | | | |
|---|---|---|---|
| 3,663,036 | 5/1972 | Johnson | 280/150 AB |
| 3,680,884 | 8/1972 | Stephenson | 280/150 AB |
| 3,721,456 | 3/1973 | McDonald | 280/150 AB |
| 3,761,111 | 9/1973 | Kemper | 280/150 AB |
| 3,770,387 | 11/1973 | Loomba | 280/150 AB X |
| 3,773,352 | 11/1973 | Radke | 280/150 AB |

Primary Examiner—M. Henson Wood, Jr.
Assistant Examiner—Michael Mar
Attorney, Agent, or Firm—Jonathan Plaut; John P. Kirby, Jr.

[57] ABSTRACT

A stored compressed gas from a stored gas chamber is supplied with a combustion gas from a gas generating chamber in a multiplicity of units supplying a single bag directly, without intervening independent connecting, diffuser or manifold structure, the bag being held by a holding device through which the multiplicity of units extend directly into the bag.

8 Claims, 4 Drawing Figures

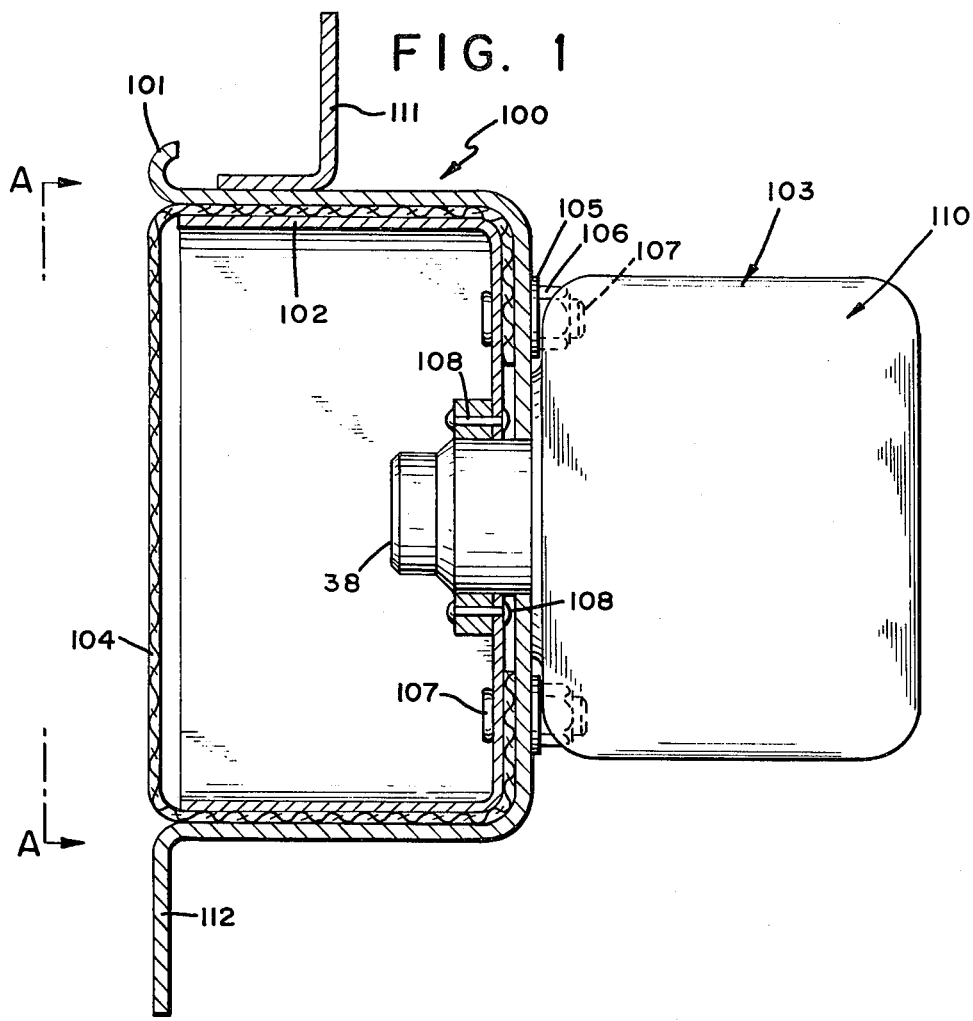
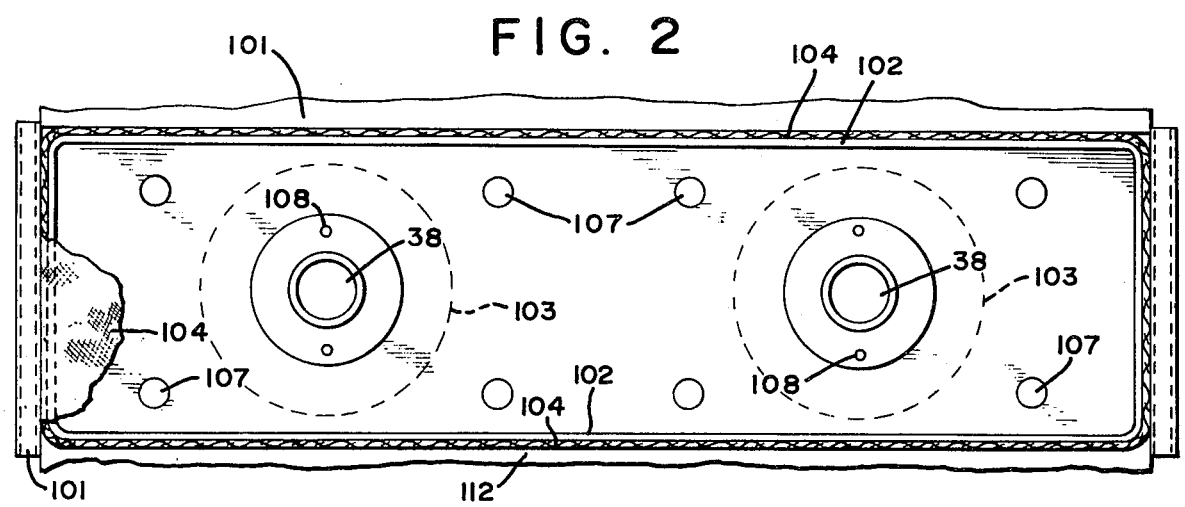

MULTIPLE MINI HYBRID WITH DIRECT BAG CONNECTION

BACKGROUND OF THE INVENTION

This invention is directed to apparatus for inflating a safety device such as a safety bag attached for use in a transport vehicle. More specifically, this invention is directed to an improved miniaturized system attached for use in a location where space and/or weight is limited and specifically this invention is directed to such a system for use, most advantageously, with the right front passenger of a vehicle in a manner as will become more apparent.

The prior art reveals various methods and apparatus for using inflatable gas bags as a safety device to be employed in motor vehicles for the purpose of restraining passengers during impact in order to prevent serious injuries. Such gas inflatable safety bags have been proposed either as an alternative or as adjunct to seat belts which are employed in automobiles.

Although seat belts provide protection against serious injuries during automobile impact, seat belts are often not used. In order to overcome this failure to use seat belts and to provide protection to the motor vehicle driver and/or passengers without requiring any voluntary act on their part, the automobile industry has been developing gas inflated safety bags. One or more gas inflated safety bags are stored in the automobile and are actuated upon impact automatically. Such actuation causes the safety bag to be inflated with a gas instantaneously. Inflation of the safety bas restrains the automobile occupants in their seats during the critical moments following impact and helps to prevent serious injury.

The safety bags are inflated by means of a generated gas or a mixture of stored and generated gases which are under pressure and which are expanding in volume. In prior art designs, the gas used to inflate the safety bag is commonly a hybrid gas which results from mixing a stored gas from a pressurized container and a generated gas resulting from combustion of a pyrotechnic material in a gas generating chamber which is commonly disposed adjacent the stored gas container.

Many of the inflator devices known in the prior art are relatively large in size and weight because of the use of connecting structure between the gas source and the bag, usually including a diffuser or manifold device independent of the gas source and connecting the separate source to the inside of the bag. In some prior art designs, the stored gas chamber or the reservior of pressurized gas and/or the gas generating chamber are physically remote from the inflatable safety bag, necessitating a series of conduits to connect the stored gas chamber and the gas generating chamber to the safety bag. What is needed is an improved design of connection of inflator and bag which allows the inflator to provide sufficient gas for inflation without excess size or weight in the connection thereof to the bag to be inflated, by eliminating such conduits.

U.S. Pat. No. 3,674,059 to Stephenson discloses apparatus for inflating a safety bag in which the gas generating chamber is physically positioned within the stored gas chamber and a manifold and elbow connecting structure connects the bag to the inflator.

U.S. Pat. No. 3,642,304 to Johnson discloses a design in which the stored gas chamber and the gas generating chamber are connected to the safety bag by a series of conduits.

A preferred embodiment of one or more of the multiplicity of gas sources is shown in the application of the inventor and another, entitled "Improved Inflator For Automobile Safety Device," Ser. No. 376,866, filed July 5, 1973, now abandoned and Ser. No. 537,497, filed Dec. 30, 1974 both assigned to the same assignee as the assignee of this application. Where pertinent, descriptive passages of that co-pending application are to be found in this application. Reference to said co-pending application will further amplify this disclosure.

SUMMARY OF THE INVENTION

It is an object of this invention to provide an arrangement in which weight and size of the gas source and attached bag structure are minimized so that a light and compact device may be installed within the vehicle body forward of the right front passenger thereof.

By utilizing a multiplicity, and preferaby two gas sources of the type described below and introducing gas from said sources directly into the air bag, which is held by a holding device through which the gas sources extend, applicant has provided a light and simple air cushion system comprising gas sources, a bag and a holding device, and dispensed with intervening independent connencting and manifold diffusion structure. Each of the multiplicity of sources of this invention is connected directly to the same bag for inflation thereof through a holding device through which extend the nozzle of each source.

In a preferred embodiment, each gas source of the invention comprises: a first chamber, called a stored gas chamber, adapted to be filled with a stored compressed gas; a second chamber, called a gas generating chamber, adapted to contain a combustible material for generating a gas; an actuating means; a third chamber, called the mixing chamber, in communication with the first chamber in which third chamber the stored gas and the generated gas are mixed to form a hybrid gas for inflating the safety device; a first barrier means disposed between the third chamber and the second chamber for preventing the stored compressed gas from entering the second chamber from the third chamber prior to actuation; an outlet means disposed between and adjacent to the third chamber and the safety device, through which outlet means the hybrid gas passes to the safety device; and second barrier means disposed between the third chamber and the outlet means to prevent the stored compressed gas from entering the outlet means from the third chamber prior to actuation.

DESCRIPTION OF THE DRAWINGS

FIG. 1 is a side plan view of the air bag system, including inflator, bag and holding device of this invention;

FIG. 2 is a view of FIG. 1 taken along line A-A showing the multiplicity of inflators;

DETAILED DESCRIPTION OF THE INVENTION

Figure 3:
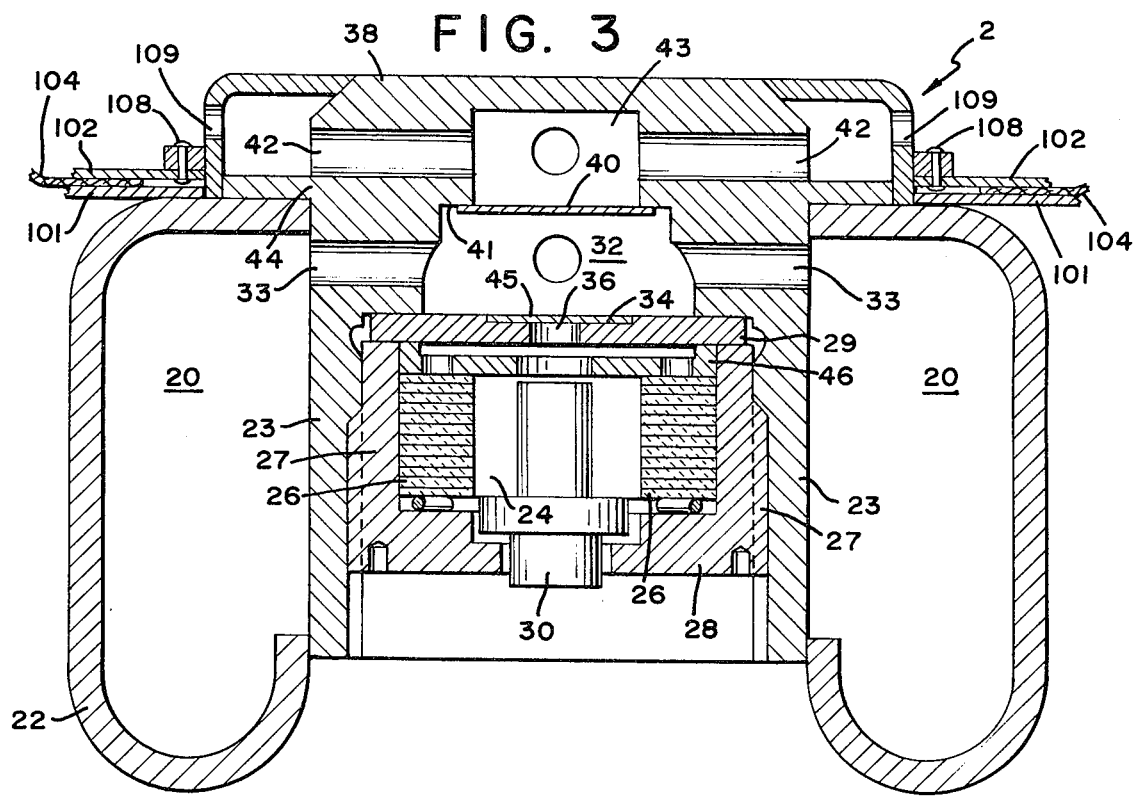
FIG. 3 is a side plan view of the inflator of this invention.

Referring to FIG. 1, a holding device 100 is shown as made up of a bracket assembly 101 and a retainer assembly 102. Extending through the holding device is a generator assembly 103 and held between the bracket assembly 101 and retainer assembly 102 of the holding device 100 is an inflatable bag 104, shown in folded position in FIG. 1. The retainer assembly 102 is held to the bracket assembly in one embodiment by bolts 107 and washer and nut structure 105 and 106. The bag 104 is thus press-held by the bracket assembly 101 and the retainer assembly 102 which are attached together.

The generator assembly 103 is in one embodiment bolted, as by bolts 108, to the retainer assembly 102 such that the exit ports 109 of the nozzle 42 (see FIG. 3) of the generator assembly 103 is within the bag 104 and the gas source 110, a combination of stored gas and generated gas (as shown and described in the preferred embodiment), of the generator assembly 103 is located on the opposite side of the holding device 100 from the bag held therein.

The holding device 100 is mounted in the preferred embodiment to the vehicle compartment 111 in front of the right front passenger as by welding or bolting it thereto. Preferably, a part 112 of the holding device 100 extends downwardly from the location of the bag so as to deny access to the passenger to the generator held behind the bracket assembly 101 of the holding device 100.

A multiplicity, and in the preferred embodiment, two gas generator assemblies 103 are connected to the holding device 100 at spaced intervals so as to extend into the same bag 104, as shown in FIG. 2. The bag 104 inflates on gas being supplied to it through ports 109 from each of the sources 110. The bag expands in its reaction against holding device 100, which also holds fast the gas sources 110. Thus, the holding device is both a holding (mounting) device for the bag and the gas sources and a reaction plate against which the bag expands.

Referring in FIG. 3 to the details of a preferred embodiment of the gas generator assembly mounted through the bracket assembly 101, the enclosed stored gas chamber 20 of the source 110 is adapted to be filled with the stored gas under pressure. The stored gas may be argon under a pressure in the range from 2,000 to 3,600 pounds per square inch gauge. The stored gas chamber 20 is an integral part of the canister-shaped inflator 2 which makes up the source 110. The stored gas chamber 20 has an outer wall 22 and has a generally toroidal shape. The stored gas chamber 20 is disposed around the outer perimeter of the inflator 2.

An enclosed gas generating chamber 24 is adapted to contain a combustible pyrotechnic material 26 which upon combustion generates a high pressure, hot combustion gas, known as the propellant gas or as the generated gas, in the gas generating chamber 24. As an example, the combustible pyrotechnic material 26 may be that disclosed in U.S. Pat. Application Ser. No. 224,524, entitled "Pyro-Technic Formulation," filed in the name of Brian K. Hamilton on Feb. 8, 1972 and Patent Application Ser. No. 387,406, filed Aug. 10, 1973, now abandoned. The gas generating chamber 24 is adjacent to, preferably partially contiguous with, but separate from, the stored gas chamber 20. The gas generating chamber 24 is disposed in the approximate center of the inflator 2 in a configuration in which the gas generating chamber is surrounded by the stored gas chamber 20. Yet, since both the stored gas chamber 20 and the gas generating chamber 24 are separate and closed chambers, the gas generating chamber 24 is actually outside of the stored gas chamber 20.

The gas generating chamber 24 is also adapted to contain an actuating means, such as a squib 30, which is used to ignite the combustible pyrotechnic material 26, thereby causing combustion of the pyrotechnic material 26. Combustion of this pyrotechnic material 26 generates a high pressure combustion gas in the gas generating chamber 24 and this high pressure combustion gas acts as a propellant. Squib 30 is mounted in the bottom wall 28 of the gas generating chamber 24 in communication with the exterior of the inflator 2 and with the pyrotechnic combustible material 26 within the gas generating chamber 24. The squib 30 is adapted to be ignited under conditions such as impact of the automobile and to ignite the combustible material, in turn. This may be accomplished by known means, such as by use of a sensor (not shown) which sends an electrical current to the squib 30 through electrical wires (not shown) attached to the squib 30.

The squib 30 may be disposed in the approximate center of the gas generating chamber 24 with the pyrotechnic combustible material 26 disposed in the outer periphery of the gas generating chamber 24 around the squib 30. The pyrotechnic combustible material 26 may be in the form of separate discs having a separator means disposed between adjacent discs to facilitate quick, uniform combustion of the pyrotechnic combustible material 26.

A mixing chamber 32 is disposed, preferably, in the approximate center of inflator 2. The mixing chamber 32 is in open communication with stored gas chamber 20 through passageway 33. Hence, stored compressed gas is present in the mixing chamber 32 prior to actuation of the inflator 2. The stored compressed gas from the stored gas chamber 20 and the generated combustion gas from the gas generating chamber 24 are mixed in the mixing chamber 32 to form a hybrid gas adapted for inflating the safety bag. The mixing chamber 32 is adjacent to, and preferably partially contiguous with, but separate from, the gas generating chamber 24 and the stored gas chamber 20.

A separate, removable heat and pressure-sensitive combustion gas barrier 34 is disposed between the mixing chamber 32 and the gas generating chamber 24. Prior to actuation of the inflator 2, the combustion gas barrier 34 covers and blocks passageway 36 and prevents the stored compressed gas from entering the gas generating chamber 24 prior to actuation of said combustible material 26. Subsequent to actuation of the inflator 2, the combustion gas barrier 34 is adapted to act as a primary barrier with reference to the generated combustion gas from the gas generating chamber 24. The combustion gas barrier 34 is adapted to rupture when the heat and pressure in the gas generating chamber 24 exceed a predetermined maximum design temperature and pressure resulting from combustion of the pyrotechnic material 26.

Rupture of the combustion gas barrier 34 allows the combustion gas to flow from the gas generating chamber 24 into the mixing chamber 32 through passageway 36 in the downstream wall 29 of the gas generating chamber 24. When the combustion gas flows into mixing chamber 32 it mixes with the stored compressed gas from stored gas chamber 20 which is already in mixing chamber 32. The mixing of the combustion gas and the compressed gas results in a hybrid gas which is adapted for inflating the safety bag.

An outlet means, such as a diffuser 38, is disposed between and is adjacent to the mixing chamber 32 and the safety bag 104, shown in FIG. 1 through which outlet means the hybrid gas passes from the mixing chamber 32 to the safety bag 104. Indeed, the outlet means is disposed inside of the safety bag 104. A separate, removable heat and pressure-sensitive hybrid gas barrier 40 is disposed between the mixing chamber 32 and the outlet means, which in this embodiment is diffuser 38. Prior to actuation of the inflator 2, the hybrid gas barrier 40 prevents the stored compressed gas from entering the outlet diffuser 38 from the mixing chamber 32 through passageway 43. Subsequent to actuation of the inflator 2, the hybrid gas barrier 40 is adapted to act as a secodary barrier and is designed to rupture when the heat and pressure in the mixing chamber 32 exceed a predetermined maximum design temperature and pressure of hybrid gas barrier 40. The hybrid gas barrier 40 is designed to rupture at a pressure which is somewhat less than the pressure at which combustion gas barrier 34 is designed to rupture. Stated another way, the maximum design pressure of combustion gas barrier 34 is higher than the maximum design pressure of hybrid gas barrier 40.

As a result, the hybrid gas barrier 40 ruptures soon after the combustion gas barrier 34. Although there is some definite interval of time between rupture of the combustion gas barrier 34 and rupture of the hybrid gas barrier 40, this time interval is so short that the rupture of hybrid gas barrier 40 may be considered to occur substantially simultaneously with the rupture of combustion gas barrier 34. When hybrid gas barrier 40 ruptures, the hybrid gas passes from mixing chamber 32 into the nozzle passageways 42 of the outlet means, diffuser 38, and then the hybrid gas passes through exit ports 109 to the safety bag 104.

The hybrid gas barrier 40 may have the shape of a thin disc adapted to fit within the circular recess 41 on the interior surface of wall 44 located between the diffuser 38 and the mixing chamber 32. Wall 44 has a passageway 43 therein which is covered and blocked by hybrid gas barrier 40 and which communicates between the mixing chamber 32 and nozzle passageways 42 upon rupture of hybrid gas barrier 40. The combustion gas barrier 34 may also have the shape of a thin disc adapted to fit within the circular recess 45 on the exterior of top wall 29 between mixing chamber 32 and combustion gas chamber 24. Both the combusion gas barrier 34 and the hybrid gas barrier 40 are adapted to be replaceable. Thus, after the inflator 2 has been actuated, the ruptured gas barrier 34 may be interchanged with a new combustion gas barrier and the ruptured hybrid gas barrier 40 may be interchanged with a new hybrid gas barrier.

For example, in one embodiment, the hybrid gas barrier 40 and the combustion gas barrier 34 are both made of fully annealed No. 304 stainless steel, which has a melting point in the range of 2,550°F. to 2,650°F. When the pyrotechnic material 26 is ignited, the heat generated by combustion of the pyrotechnic material 26 is at a temperature of approximately 5,400°F. After ignition of the pyrotechnic material 26, this heat is felt by both the combustion gas barrier 34 and the hybrid gas barrier 40. The combustion gas barrier 34 is designed to rupture at approximately 4,200 pounds per square inch gauge pressure (p.s.i.g.) in the presence of heat after ignition of the pyrotechnic material 26. Prior to ignition of the pyrotechnic material 26, that is, in the absence of heat, the combustion gas barrier 34 is adapted to rupture at approximately 5250 psig. The hybrid gas barrier 40 is designed to rupture at approximately 4,000 psig in the presence of heat after ignition of the pyrotechnic material 26. Prior to ignition of the pyrotechnic material, that is, in the absence of heat, the hybrid gas barrier 40 is designed to rupture at approximately 5,250 psig. Thus, prior to actuation of the inflator 2, the combustion gas barrier 34 and the hybrid gas barrier 40 are able to withstand the pressure of the stored gas which is in the stored gas chamber 20 and in the mixing chamber 32, the stored gas being under a pressure of approximately 3,600 psig. But, when the pyrotechnic material 26 is ignited and generates a high pressure hot combustion gas at a temperature of approximately 5,400°F. and a pressure above 5,000 psig, such as 6,000 psig., the heat and pressure cause the combustion gas barrier 34 to rupture. Almost immediately after the combustion gas barrier 34 ruptures, the hybrid gas barrier 40 also ruptures. The passageway 36 between the gas generating chamber 24 and the mixing chamber 32 may be narrower than the passageway 43 between the mixing chamber 32 and the diffuser 38. Passageway 36 may be 110/1000 of an inch and passageway 43 may be one-half inch. The foregoing data in this example are given by way of illustration. The design of the inflator 2 may be varied to use different temperatures, pressures and size measurements.

The combustion gas barrier 34 may have weak points disposed therein and these weak points are designed to rupture when the heat and pressure exceed a maximum design temperature and pressure. As a result, the entire combustion gas barrier 34 need not rupture, but only the weak points within the barrier. When these weak points rupture, small ports are formed in combustion gas barrier 34. These ports cause the combustion gas to flow at high velocity and direct the combustion gas toward the barrier 40 to cause rupture thereof rather than toward the stored gas chamber 20.

A strainer 46 may be disposed between the gas generating chamber 24 and the combustion gas barrier 34. This strainer 46 is adapted to allow passage of the combustion gas from the gas generating chamber 24 but to prevent passage of most of the combustion residue resulting from the combustion of the pyrotechnic combustible material 26 from the gas generating chamber 24 to the mixing chamber 32. This strainer 46 thus prevents hot pieces of combustion residue from passing into the inflatable safety bag 104.

In one embodiment, the method of utilizing the hybrid generator assembly 110 described with relation to FIG. 3 above would be as follows: filling the stored gas chamber 20 with a compressed gas, the stored gas chamber 20 being in communication with a mixing chamber 32; firing a combustible pyrotechnic material 26 disposed in a closed gas generating chamber 24, the gas generating chamber 24 being separate from the stored gas container 20, upon impact of said vehicle, whereby a combustion gas is generated in the gas generating chamber 24; releasing the generated combustion gas from the gas generating chamber 24 to the mixing chamber 32 by rupturing the combustion gas barrier 34; mixing the combustion gas generated from the combustible pyrotechnic material 26 with the compressed stored gas from the stored gas container 20 in the mixing chamber 32, thereby forming a hybrid gas in the mixing chamber 32 composed of the generated combustion gas and the stored compressed gas; and releasing the hybrid gas directly to outlet ports 109 in communication with the inflatable safety bag 104, shown in FIG. 1 by rupturing the hybrid gas barrier 40.

Combustion gas passes directly from the gas generating chamber 24 to the mixing chamber 32, then as a component of the hybrid gas, directly from the mixing chamber 32 to the outlet means, such as diffuser 38, and then to the safety bag 104, without passing through the stored gas chamber 20, thereby minimizing the transfer of heat from the combustion gas to the stored gas container 20. When the hybrid gas barrier 40 ruptures, there is a rush of the stored compressed gas from the higher pressure environment in the stored gas chamber 20 to the lower pressure environment in the diffuser 38. This flow of stored compressed gas tends to carry the hot generated gas with it to the diffuser, rather than allowing the generated gas to flow into the stored gas chamber 20.

The step of releasing the generated combustion gas comprises rupturing a combustion gas barrier 34. The step of releasing the hybrid gas comprises rupturing a hybrid gas barrier 40. The combustion gas barrier 34 may have weak points disposed therein and the step of releasing the combustion gas comprises rupturing the combustion gas barrier 34 at these weak points in the barrier. This produces small ports in the combustion gas barrier 34, thereby increasing the velocity of the combustion gas passing through the combustion gas barrier 34 at these ports. This increase in velocity of the combustion gas helps to direct the combustion gas against the barrier 40, into the diffuser 38 and into the inflatable safety bag, rather than into the stored gas chamber 20.

Figure 4:
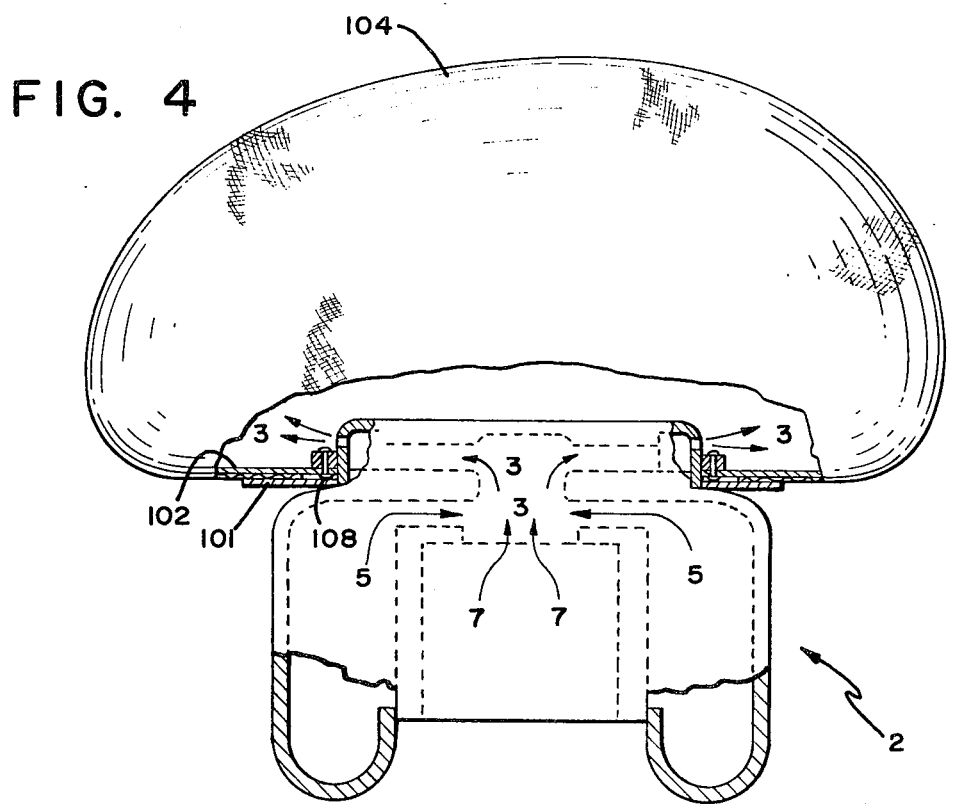
FIG. 4 is an enlarged cross-sectional view of the inflator of FIG. 3, but showing gas flow.

As may be seen from FIG. 4, the gas provided by the assembly 103 to inflate the safety bag is a hybrid gas 3 comprised of two gas components, a stored compressed gas 5 and a generated combustion gas 7 which acts as a propellant. It has been found that a stored gas source will have to be large and heavy if it is to supply enough gas to fill even the smallest bag for vehicle occupant (other than the driver) protection, such as what may be used for pprotection of a right front passenger. Where a bag of 8 cubic feet is required, as is normally the case, a stored gas source is too large and heavy and impractical. The situation is even more exaggerated for a 12 cubic foot bag as is required in larger vehicle models. Likewise, a gas source made up of solely generated gas has been found too impractical for the larger size bag, such as the bag which must be used for right front passenger protection, especially since it is necessary to generate so much gas, that the temperatures of the gas generation become prohibitive, as do, in some cases, the evolution of toxid constituents to the gas, such as nitrous constituents. Therefore, it has been found that it is extremely advantageous to fulfill the gas requirements of the right front passenger bag with a hybrid gas, and preferably with the hybrid gas of a system of the type described with relation to FIGS. 3 and 4 by utilizing a multiplicity of, and preferably two, of the sources described above.

It is emphasized, however, that the specific embodiment of hybrid generator shown in FIG. 1 is merely illustrative, although preferable of a hybrid gas source to be used in multiple in this invention.

Applicant has advantageously found it possible to dispense with all connecting structure between the gas generating source and the bag to be filled (that is, elbows, diffusers separate from the gas source, manifolds, etc.), by simply having a holding device which provides both (1) the holding structure for the bag and the mounting structure for the multiplicity of hybrid gas sources which extend therethrough into the bag and (2) as earlier discussed, the reaction plate for inflating the bag.

What is claimed is:

1. A system for protecting a passenger in a vehicle consisting of an inflatable bag, a multiplicity of gas sources for said bag and a holding device for said bag through which each of the multiplicity of sources extends directly into said bag, said holding device comprising a bracket assembly and a retainer assembly with a bag pressed therebetween, said multiplicity of gas sources passing through an aperture in each of said assemblies so as to extend into said bag, gas outlet ports of each of said gas sources being contained within said bag and the gas storage and generating assemblies of the gas sources being located outside of the bag and one the opposite side of said holding device from said bag, each of said multiplicity of gas sources comprising:
   a. a stored gas chamber adapted to be filled with compressed gas;
   b. a gas generating chamber, adjacent to but separate from said stored gas chamber, said gas generating chamber being adapted to contain a combustible material, said combustible material being adapted to generate high pressure combustion gas in said gas generating chamber upon combustion, said gas generating chamber being adapted to contain an actuating means for igniting said combustible material, thereby causing combustion of said combustible material;
   c. a mixing chamber in communication with said stored gas chamber, in which mixing chamber said stored compressed gas and said generated combustion gas are mixed to form a hybrid gas adapted for inflating said safety device;
   d. a combustion gas barrier disposed between said mixing chamber and said gas generating chamber, said combustion gas barrier being adapted to prevent said stored compressed gas from entering said gas generating chamber from said mixing chamber prior to actuation of said combustible material, and being adapted to rupture when the heat and pressure in said gas generating chamber exceed a predetermined temperature and pressure of said combustion gas barrier, whereby said combustion gas flows into said mixing chamber;
   e. an outlet means including said outlet ports being disposed between and being adjacent to said mixing chamber and said safety device, through which outlet means said hybrid gas passes from said mixing chamber to said safety device;
   f. a hybrid gas barrier disposed between said mixing chamber and said outlet means to prevent said stored compressed gas from entering said outlet means from said mixing chamber prior to actuation of said combustible material, said hybrid gas barrier being adapted to rupture when the heat and pressure in said mixing chamber exceed a predetermined temperature and pressure, whereby said hybrid gas flows through said outlet ports and into said safety device, the pressure at which said combustion gas barrier is designed to rupture being higher than the pressure at which said hybrid gas barrier is designed to rupture;

g. said combustion gas barrier having weak points disposed therein, said weak points being designed to rupture to form gas passing apertures in said barrier when the heat and pressure in said gas generating chamber exceeds a predetermined temperature and pressure; and h. wherein said actuating means for igniting said combustible material comprises a squib mounted in the wall of the gas generating chamber in communication with the exterior of the inflator and with said combustible material within said gas generating chamber.

2. A system as set forth in claim 1 and further comprising a strainer disposed between said gas generating chamber and said combustion gas barrier, said strainer being adapted to allow passage of said combustion gas from said gas generating chamber to said mixing chamber and said strainer being adapted to prevent passage of most of the combustion residue resulting from the combustion of said combustible material from said gas generating chamber to said mixing chamber.

3. A system for protecting a passenger in a vehicle consisting of an inflatable bag, a multiplicity of gas sources for said bag and a holding device for said bag through which each of the multiplicity of sources extends directly into said bag, each of said multiplicity of gas sources comprising:

a. a stored gas chamber adapted to be filled with a compressed gas;

b. a gas generating chamber, adjacent to but separate from said stored gas chamber, said gas generating chamber being adapted to contain a combustible material, said combustible material being adapted to generate high pressure combustion gas in said gas generating chamber upon combustion, said gas generating chamber being adapted to contain an actuating means for igniting said combustible material, thereby causing combustion of said combustible material;

c. a mixing chamber in communication with said stored gas chamber, in which mixing chamber said stored compressed gas and said generated combustion gas are mixed to form a hybrid gas adapted for inflating said safety device;

d. a combustion gas barrier disposed between said mixing chamber and said gas generating chamber, said combustion gas barrier being adapted to prevent said stored compressed gas from entering said gas generating chamber from said mixing chamber prior to actuation of said combustible material, and being adapted to rupture when the heat and pressure in said gas generating chamber exceed a predetermined temperature and pressure of said combustion gas barrier, whereby said combustion gas flows into said mixing chamber;

e. an outlet means including outlet ports being disposed between and being adjacent to said mixing chamber and said safety device, through which outlet means said hybrid gas passes from said mixing chamber to said safety device;

f. a hybrid gas barrier disposed between said mixing chamber and said outlet means to prevent said stored compressed gas from entering said outlet means from said mixing chamber prior to actuation of said combustible material, said hybrid gas barrier being adapted to rupture when the heat and pressure in said mixing chamber exceed a predetermined temperature and pressure, whereby said hybrid gas flows through said outlet ports and into said safety device, the pressure at which said combustion gas barrier is designed to rupture being higher than the pressure at which said hybrid gas barrier is designed to rupture;

g. said combustion gas barrier having weak points disposed therein, said weak points being designed to rupture to form gas passing apertures in said barrier when the heat and pressure in said gas generating chamber exceed a predetermined temperature and pressure; and h. wherein said actuating means for igniting said combustible material comprises a squib mounted in the wall of the gas generating chamber in communication with the exterior of the inflator and with said combustible material within said gas generating chamber.

4. A system as set forth in claim 3 and further comprising; a strainer disposed between said gas generating chamber and said combustion gas barrier, said strainer being adapted to allow passage of said combustion gas from said gas generating chamber to said mixing chamber and said strainer being adapted to prevent passage of most of the combustion residue resulting from the combustion of said combustible material from said gas generating chamber to said mixing chamber.

5. A system for protecting a passenger in a vehicle consisting of an inflatable bag, a multiplicity of gas sources for said bag and a holding device for said bag through which each of the multiplicity of sources extends directly into said bag, said holding device comprising a bracket assembly and a retainer assembly with the bag pressed therebetween, said multiplicity of gas sources passing through an aperture in each of said assemblies so as to extend into said bag, each of said multiplicity of gas sources comprising:

a. a stored gas chamber adapted to be filled with a compressed gas;

b. a gas generating chamber, adjacent to but separate from said stored gas chamber, said gas generating chamber being adapted to contain a combustible material, said combustible material being adapted to generate high pressure combustion gas in said gas generating chamber upon combustion, said gas generating chamber being adapted to contain an actuating means for igniting said combustible material, thereby causing combustion of said combustible material;

c. a mixing chamber in communication with said stored gas chamber, in which mixing chamber said stored compressed gas and said generated combustion gas are mixed to form a hybrid gas adapted for inflating said safety device;

d. a combustion gas barrier disposed between said mixing chamber and said gas generating chamber, said combustion gas barrier adapted to prevent said stored compressed gas from entering said gas generating chamber from said mixing chamber prior to actuation of said combustible material, and being adapted to rupture when the heat and pressure in said gas generating chamber exceed a predetermined temperature and pressure of said combustion gas barrier, whereby said combustion gas flows into said mixing chamber;

e. an outlet means including outlet ports being disposed between and being adjacent to said mixing chamber and said safety device, through which outlet means said hybrid gas passes from said mixing chamber to said safety device;

f. a hybrid gas barrier disposed between said mixing chamber and said outlet means to prevent said stored compressed gas from entering said outlet means from said mixing chamber prior to actuation of said combustible material, said hybrid gas barrier being adapted to rupture when the heat and pressure in said mixing chamber exceed a predetermined temperature and pressure, whereby said hybrid gas flows through said outlet ports and into said safety device, the pressure at which said combustion gas barrier is designed to rupture being higher than the pressure at which said hybrid gas barrier is designed to rupture;

g. said combustion gas barrier having weak points disposed therein, said weak points being designed to rupture to form gas passing apertures in said barrier when the heat and pressure in said gas generating chamber exceeds a predetermined temperature and pressure; and h. wherein said actuating means for igniting said combustible material comprising a squib mounted in the wall of the gas generating chamber in communication with the exterior or the inflator and with said combustible material within said gas generating chamber.

6. A system as set forth in claim 5 and further comprising a strainer disposed between said gas generating chamber and said combustion gas barrier, said strainer being adapted to allow passage of said combustion gas from said gas generating chamber to said mixing chamber and said strainer being adapted to prevent passage of most of the combustion residue resulting from the combustion of said combustible material from said gas generating chamber to said mixing chamber.

7. A system for protecting a passenger in a vehicle consisting of an inflatable bag, a multiplicity of gas sources for said bag and a holding device for said bag through which each of the multiplicity of sources extends directly into said bag, said holding device comprising a bracket assembly and a retainer assembly with the bag pressed therebetween, said multiplicity of gas sources passing through an aperture in each of said assemblies so as to extend into said bag, each of said multiplicity of gas sources comprising:

a. a stored gas chamber adapted to be filled with a compressed gas;

b. a gas generating chamber, adjacent to but separate from said stored gas chamber, said gas generating chamber being adapted to contain a combustible material, said combustible material being adapted to generate high pressure combustion gas in said gas generating chamber upon combustion, said gas generating chamber being adapted to contain an actuating means for igniting said combustible material, thereby causing combustion of said combustible material;

c. a mixing chamber in communication with said stored gas chamber, in which mixing chamber said stored compressed gas and said generated combustion gas are mixed to form a hybrid gas adapted for inflating said safety device;

d. a combustion gas barrier disposed between said mixing chamber and said gas generating chamber, said combustion gas barrier being adapted to prevent said stored compressed gas from entering said gas generating chamber from said mixing chamber prior to actuation of said combustible material, and being adapted to rupture when the heat and pressure in said gas generating chamber exceed a predetermined temperature and pressure of said combustion gas barrier, whereby said combustion gas flows into said mixing chamber;

e. an outlet means including said outlet ports being disposed between and being adjacent to said mixing chamber and said safety device, through which outlet means said hybrid gas passes from said mixing chamber to said safety device; and f. a hybrid gas barrier disposed between said mixing chamber and said outlet means to prevent said stored compressed gas from entering said outlet means from said mixing chamber prior to actuation of said combustible material, said hybrid gas barrier being adapted to rupture when the heat and pressure in said mixing chamber exceed a predetermined temperature and pressure, whereby, said hybrid gas flows through said outlet ports and into said safety device, the pressure at which said combustion gas barrier is designed to rupture being higher than the pressure at which said hybrid gas barrier is designed to rupture.

8. A system as set forth in claim 7 and further comprising a strainer disposed between said gas generating chamber and said combustion gas barrier, said strainer being adapted to allow passage of said combustion gas from said gas generating chamber to said mixing chamber and said strainer being adapted to prevent passage of most of the combustion residue resulting from the combustion of said combustible material from said gas generating chamber to said mixing chamber.

* * * * *